July 15, 1952  H. A. WILSON  2,603,068
OFFSHORE WORKING PLATFORM AND METHOD OF ERECTING SAME
Filed Nov. 8, 1948  7 Sheets—Sheet 1

Harvey A. Wilson
INVENTOR

BY

ATTORNEY

July 15, 1952 H. A. WILSON 2,603,068
OFFSHORE WORKING PLATFORM AND METHOD OF ERECTING SAME
Filed Nov. 8, 1948 7 Sheets-Sheet 2

INVENTOR
Harvey A. Wilson
BY
ATTORNEY

July 15, 1952           H. A. WILSON           2,603,068
OFFSHORE WORKING PLATFORM AND METHOD OF ERECTING SAME
Filed Nov. 8, 1948           7 Sheets—Sheet 4

Harvey A. Wilson
INVENTOR

BY

ATTORNEY

Harvey A. Wilson
INVENTOR

BY
ATTORNEY

Patented July 15, 1952

2,603,068

UNITED STATES PATENT OFFICE 2,603,068

OFFSHORE WORKING PLATFORM AND METHOD OF ERECTING SAME

Harvey A. Wilson, Brazoria, Tex.

Application November 8, 1948, Serial No. 58,824

3 Claims. (Cl. 61—46)

This invention relates to marine foundation structures and particularly to off-shore working and drilling platforms for oil wells and methods for constructing and erecting same.

The drilling of oil wells in off-shore locations, such as on the Continental shelf along the coasts of the United States, particularly off the coast of the Gulf of Mexico, in water depths ranging from 20 to 60 feet or more, is increasing greatly in importance and creates many new problems in providing firm and safe support for the heavy drilling rigs employed. Since such locations may be many miles from shore, open ocean conditions prevail, including often severe wind and wave conditions, which make for great expense and difficulty in transporting and erecting foundations which are adequate to meet the conditions encountered.

Drilling platforms which are most widely used at present, are constructed in the form of large templates composed of a plurality of sections, each of which comprises a group of spaced hollow steel columns inter-laced with structural bracing. The columns are normally made of a fixed length to extend from the land bottom underlying the water location to above the average wave level. Each of these template sections must be transported individually to the water location, set up on bottom and piling driven through the hollow columns into the underlying land to firmly anchor the section in place. When the requisite number of such template sections have been put in place and anchored with piling, a structural steel platform is then constructed on their upper ends and the drilling rig and its appurtenances are then moved in and placed on the platform. This type of construction entails a great amount of labor and extremely high costs, not only in erecting the platform but also in removing it when drilling is completed. Since there is no positive method of determining beforehand whether or not oil in producing quantities will be found at a particular location, the costs involved in erecting and removing such foundations in the number of locations necessary to properly explore and develop even a few square miles is enormous, and may become prohibitive even for the very largest companies, when it is considered that one such platform recently erected cost more than $1,250,000, and the cost of its removal may be equally as great.

The present invention, therefore, has for its principal object the provision of an improved drilling platform which may be employed for off-shore drilling in any of the water depths commonly encountered; which is transportable to a water location with a minimum of difficulty and expense, and which may subsequently be removed for transportation to another location likewise with a minimum of difficulty and expense.

A more specific object is to provide a completely prefabricated platform structure having telescoping sections adapted to buoyantly support the platform structure while in transit or on location and which are extendible to form structural piers adapted to support the platform structure from the land bottom.

The structure, in accordance with one embodiment of this invention, comprises a platform of open-work structural form composed of a plurality of hollow vertical columns uniformly spaced about the area of the platform and connected together by suitable longitudinal and transverse beams and cross bracing to provide a box-like structure of the desired area and height. A plurality of buoyant supports are disposed beneath the platform and connected thereto by groups of hollow columns telescopically inserted in registering groups of the hollow columns of which the platform is composed. The buoyant supports are adapted to floatingly support the platform when the latter is in transit and are further adapted to be extended to the land bottom by means of their telescoping connections with the platform to form footings to support the platform directly from the land bottom. By suitable control of their buoyancy, some of the supports may be lowered to the land bottom while the platform is floatingly supported on the remaining supports, and while the platform is being rigidly connected to the extended columns of the submerged supports. Thereafter the remaining supports are lowered to the bottom and rigidly connected to the platform, whereby the platform will be supported entirely directly from the land bottom. By reversal of this procedure, the supports may be retracted to their original floating positions beneath the platform for transport thereof to another location.

The foregoing and other objects and advantages of this invention will become apparent from the following detailed description when read in conjunction with the accompanying drawings which illustrate several embodiments in accordance with this invention.

In the embodiment illustrated particularly in Figs. 1 to 6, inclusive, the structure comprises a generally rectangular platform, designated generally by the numeral 21, which is of substantial height and composed of several vertically spaced layers of laterally spaced apart parallel longitudinal and transverse beams 22—22. A hollow tubular column 23, open at each end, extends vertically through each of the several points of intersection of beams 22, the columns extending from top to bottom of the platform and being rigidly connected to the several beams 22. Suitable cross bracing members 24 extend between adjacent columns to rigidly inter-lace the several members of the platform to thereby provide an open-work structure of sufficient strength to support the load of a derrick 25 mounted centrally on the upper surface of the platform, and the other parts of a conventional drilling rig and its appurtenances (not shown). Suitable flooring 26 may be laid across the upper surface of the platform to form a deck therefor. Similar flooring (not shown) may be laid at an appropriate intermediate level and across the bottom of the platform to form additional working surfaces at these levels. The platform will normally be of sufficient height to provide adequate head room between these levels for the movements of workers and for installation of some machinery. When erected, the platform will ordinarily be positioned so that at least its upper deck will be above any anticipated normal wave heights. The open character of the platform will allow passage of waves through the structure without substantial resistance thereto.

Figure 6:
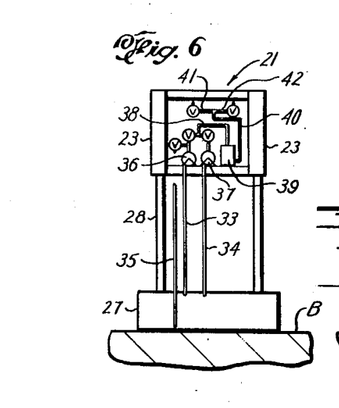
Fig. 6 is a diagrammatic view of the apparatus employed for controlling the buoyancy of buoyant supports for the structure.
Figure 19:
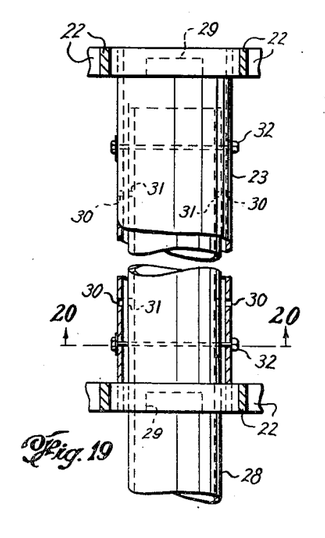
Fig. 19 is an enlarged view showing a typical telescoping connection between the platform and its support members.
Figure 20:
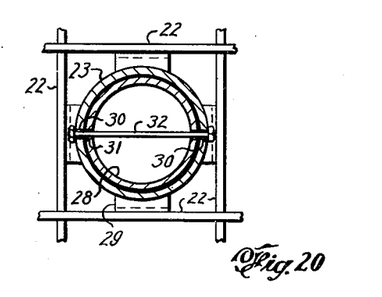
Fig. 20 is a cross-section along line 20—20 of Fig. 19.

A number of buoyancy members 27, comprising hollow chambers, are arranged side-by-side beneath platform 21 and extending transversely thereof. Chambers 27 are preferably rectangular in form and of such dimensions that their combined width is substantially equal to the length of the overlying platform, while their length is such that they will extend laterally for a substantial distance beyond the opposite sides of the platform (see Fig. 2). Chambers 27 are spaced slightly apart to provide clearance for unrestricted relative vertical movement thereof. Five such chambers are shown in the embodiment illustrated in Figs. 1 to 5, but it will be understood that the number of such chambers may be varied, depending principally upon the dimensions of the platforms to be supported thereby, and other structural and design conditions to be met in each particular case. The volumes of chambers 27 will be made such that any two or more of them will safely support the entire load of the platform structure when afloat. Each of the chambers 27 is provided with a group of vertically extending tubular columns 28 which are adapted to register with, and to be telescopically adjustable in, a corresponding group of the columns 23. The lower ends of columns 28 extend entirely through their respective chambers 27, are rigidly connected thereto, and are open at their upper and lower ends. Figs. 19 and 20 illustrate a typical connection between columns 23 and 28 by means of which relative longitudinal adjustment may be effected between the columns. As there illustrated, column 23 is inserted through the intersection of spaced pairs of beams 22 and rigidly connected thereto by means of clip plates 29. Vertically spaced pairs of registering holes 30 are provided in column 23, and similarly spaced pairs of holes 31 are provided in column 28. Bolts 32 are removably inserted through suitable registering pairs of the holes 30 and 31 to lock the columns together at any desired relative positions. Chambers 27 are each of controllable buoyancy being suitably compartmented and provided with any suitable and conventional means for regulating the buoyancy thereof. Fig. 6 illustrates more or less diagrammatically a suitable arrangement of apparatus for controlling the buoyancy of one of the chambers 27. Such apparatus includes a a pair of flexible pipes 33 and 34 which extend into the upper interior portion of chamber 27 and are adapted to introduce therein air and liquid ballast, respectively. A vent pipe 35 extends downwardly into the chamber adjacent its bottom and upwardly to a height which will be above the surface of the water when chamber 27 is resting on the underlying land. The upper ends of pipes 33 and 34 are wound about reels 36 and 37, respectively, whereby they may be payed-out or drawn in as chamber 27 is extended or retracted relative to the platform. The inlet ends of the pipes 33 and 34 are connected to suitably valved branches of a header 38 which is connected to the discharge of a pump 39 having a suction header 40 provided with valved branches 41 and 42 for connection to suitable sources of supply of air and ballasting liquids (not shown). With this arrangement ballasting liquid may be introduced into chamber 27 and the air employed to blow such ballast from the chamber. Vent pipe 35 forms the means for the escape from chamber 27 of such ballast or air as the case may be. The buoyancy of chamber 27 may thus be varied as desired. It will be understood that various other conventional means may be employed for regulating the buoyancy of chamber 27, as may be required.

Figure 1:
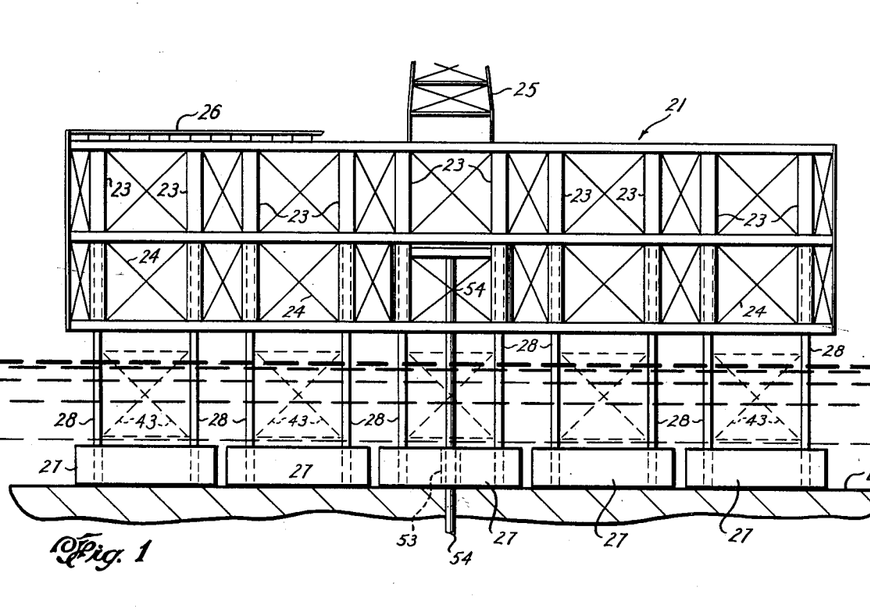
Fig. 1 is a side elevation of a platform structure in accordance with one embodiment of this invention, showing the structure in fully erected position at a water location.
Figures 2, 3:
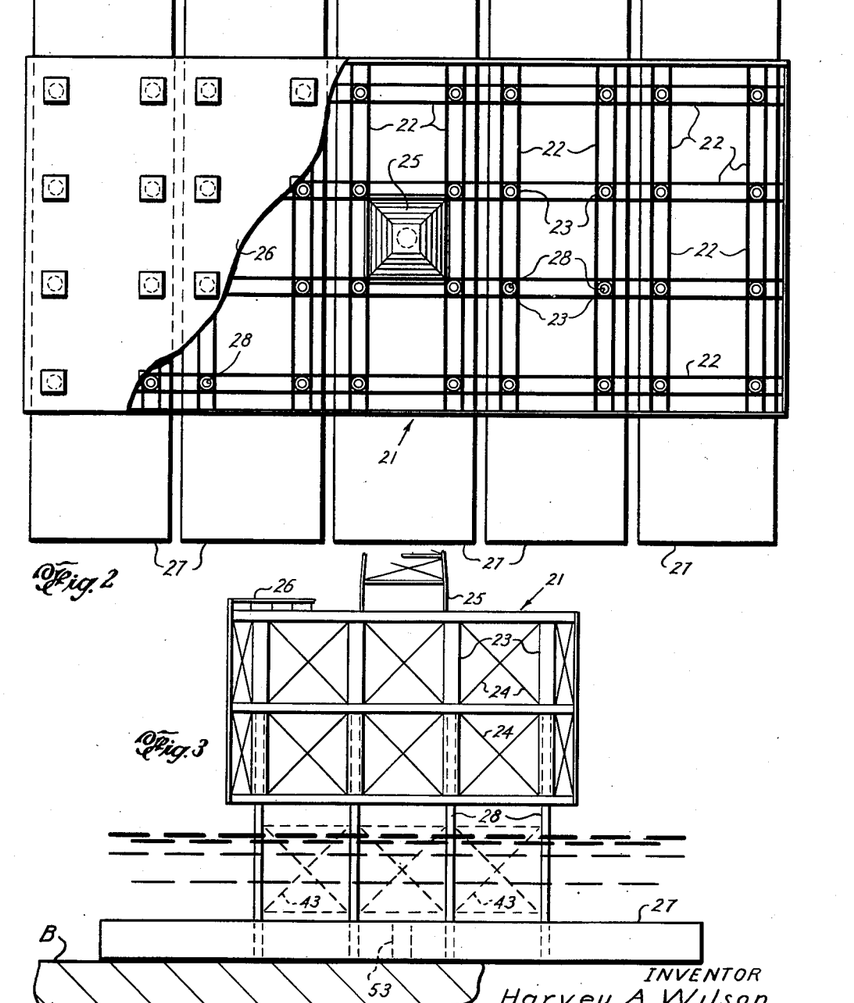
Fig. 2 is a plan view of the erected structure.
Fig. 3 is an end elevation of the erected structure.
Figure 4:
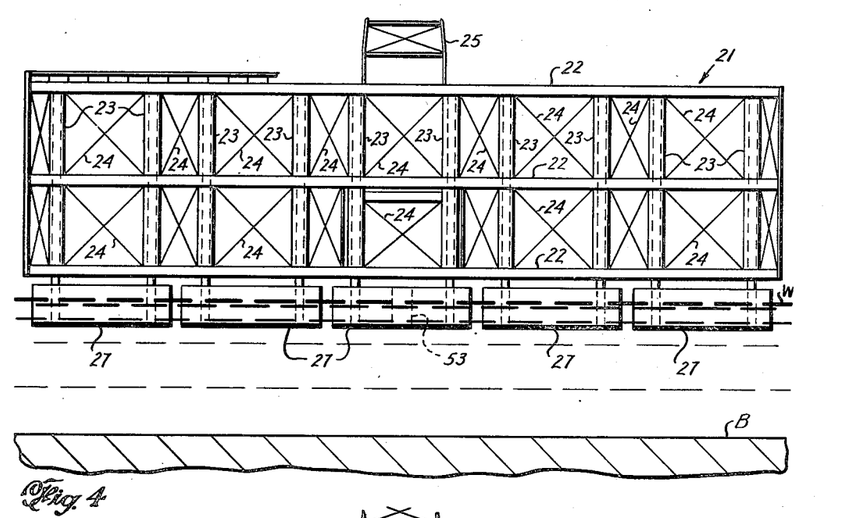
Fig. 4 is a side elevation showing the structure in floating position.
Figure 5:
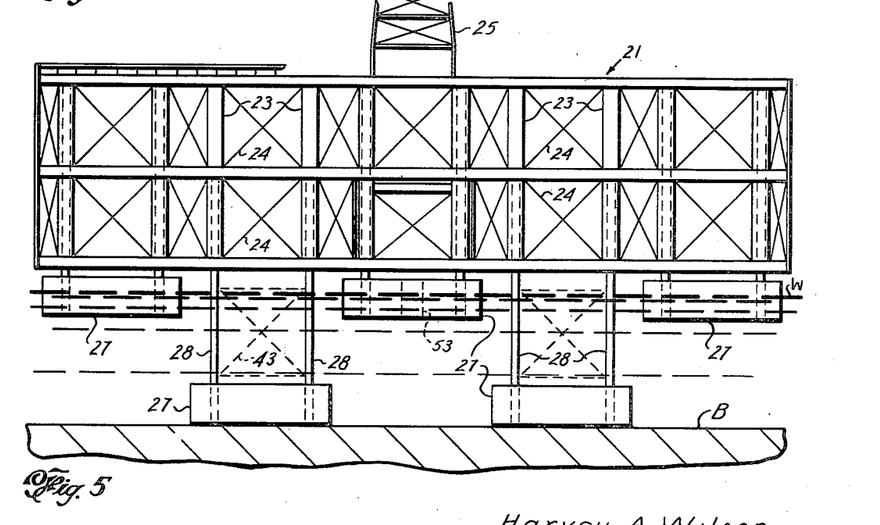
Fig. 5 is a view similar to Fig. 4 showing the structure at one stage of erection.

In construction and operation of the structure, platform 21 will be prefabricated in its entirety and mounted on chambers 27 with columns 28 of the latter in their fully retracted position. Chambers 27 will be rendered sufficiently buoyant to floatingly support the entire structure substantially in the position illustrated in Fig. 4. Derrick 25 and its associated drilling equipment may be initially fully installed on the platform if desired. The structure may now be moved in its entirety to the selected drilling location over the surface of the water W, chambers 27 acting as the floating supports therefor during transit and their lateral extensions serving to stabilize the structure during such movement. When the location is reached, the buoyancy of selected ones of the chambers 27 will be reduced to allow these chambers to sink toward the land bottom B while the platform remains floatingly supported on remaining chambers 27 in which the buoyancy will continue to be maintained. (See Fig. 5.) Columns 28 of the descending chambers will be disconnected from their enclosing columns 23 to permit the descent of these chambers. As the selected chambers descend below the bottom of platform 21, suitable cross bracing 43 will be installed between the thus exposed portions of columns 28 to effectively inter-lace and brace these columns and thereby combine them into a rigid structural column of substantial load-supporting strength. It will be understood that the descent of chambers 27 may be made in stages by appropriate regulation of their buoyancy to permit insertion of the required cross-bracing. Re-insertion of bolts 32 may be employed, if necessary or desirable, at each stage to hold the chamber in position while the cross-bracing is applied. When the chambers have thus been lowered until they rest on bottom B, bolts 32 will be re-inserted between columns 23 and columns 28 in their fully extended positions to rigidly lock the platform to the upper ends of columns 28, or other suitable and conventional fastening means may be employed to connect platform 21 for firm support by the extended columns. The remaining chambers 27 may now be lowered in the same manner, the load of the platform having now been transferred to the previously lowered chambers and their extended columns, until they too rest on bottom B. Cross bracing 43 will also be installed between the columns carried by these chambers in the manner previously described and platform 21 will also be firmly and supportedly fastened to these chambers, thereby completing the erection of the structure at the drilling location. Figs. 1 and 3 illustrate the positions of the parts of the structure in the thus fully erected position. Chambers 27, with their lateral extensions, thus form a broad and solid footing for the platform structure which is rigidly supported therefrom by means of the structural supporting columns formed by columns 28 and their inter-lacing cross-bracing.

It will be understood that the number of chambers 27 initially lowered and their positions relative to the remaining chambers will be selected so as to provide a balanced arrangement for safely supporting the platform during the several stages of operation required to complete the landing of the structure on the land bottom. In the embodiment illustrated, a total of five chambers are employed, the second and fourth of these being lowered while the platform is supported on the remaining three, which are thus symmetrically disposed beneath the platform. The two chambers first lowered will, by this selection, provide symmetrically balanced supports for the platform while the other three are being lowered and landed on bottom. It will be understood that various other numbers and arrangements of the buoyant chambers and their extended columns may be successfully employed, the embodiment above-described being given merely by way of illustration. In the illustrative embodiment, the dimension of chambers 27 will be made such that two or more will have sufficient capacity to buoyantly support the entire platform load. Other numbers, sizes and capacities may be employed depending upon the size of the platform and the loads to be supported by the chambers.

When the structure has been fully erected on bottom B, as above described, it may be employed for drilling or for any other operations for which it may be designed. When such operations have been completed and it is desired to remove the structure to another location, the erecting operations above-described will, in general, be reversed. That is, the connections between the platform and certain ones of the chambers will be released and the ballast contained in these chambers will be removed as by blowing with air through pipes 33. The selected chambers will thus be rendered buoyant and will rise vertically being guided by the telescoping connection between columns 28 and 23. As the chambers rise through the water, cross-bracing 43 will be progressively removed until the chambers have returned to their initial positions immediately beneath the platform and again provide buoyant support for the platform. The remaining chambers are then released, rendered buoyant, and retracted to their original positions and the entire structure will now be afloat and prepared for movement to another location.

Figure 7:
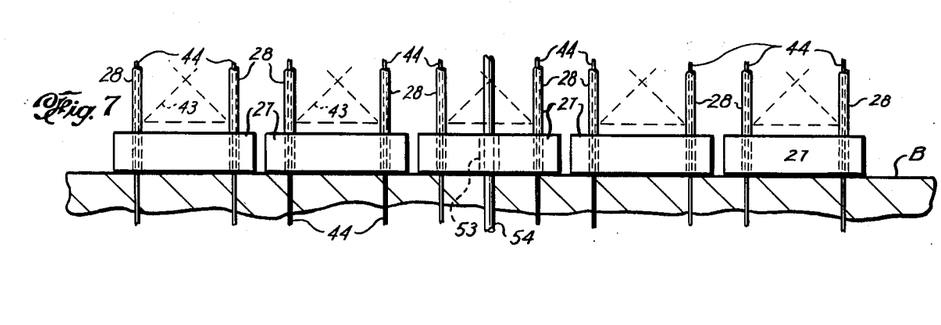
Fig. 7 is a fragmentary view of a modification of the structure illustrated in Fig. 1 and employing piling for anchoring the structure to the land bottom.

Fig. 7 illustrates a modification of the embodiment previously described in which piles 44 of any conventional type may be inserted through the registering bores of columns 23 and 28 and driven in land bottom B to additionally anchor the structure firmly to the land bottom. These piles will first be extracted in any conventional manner when it is desired to refloat the structure in the manner previously described.

Figure 8:
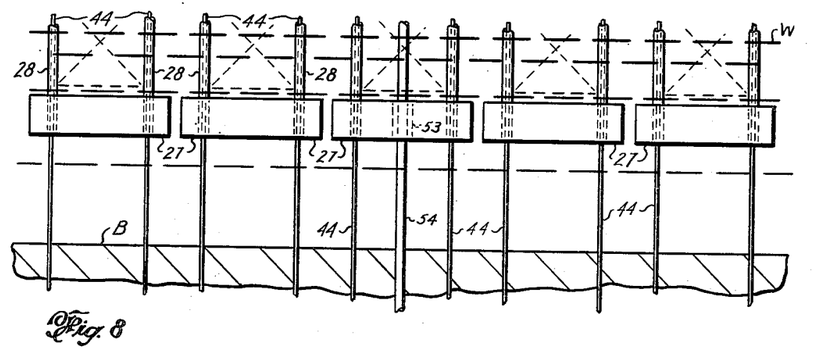
Fig. 8 is a view similar to Fig. 7 illustrating still another modification employing piling.

Fig. 8 illustrates still another embodiment employing piles 44 which are driven into bottom B to support a portion of the load of the platform while the remainder of the load is buoyantly supported by chambers 27, which, in this modification, will be lowered only part way to bottom B. This modification is particularly adapted for use in deep water.

Figures 9, 18:
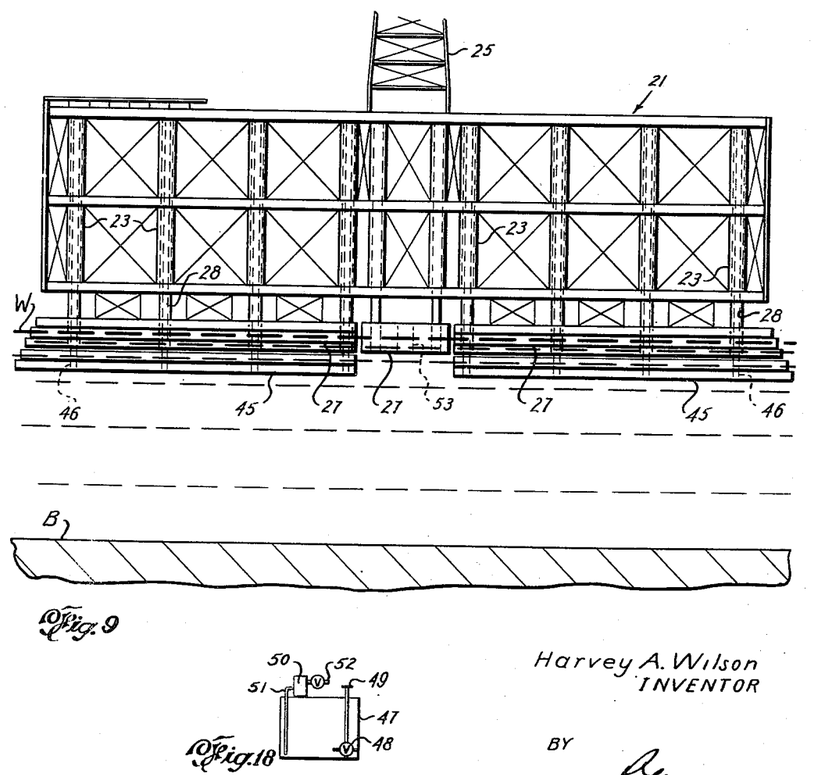
Fig. 9 is a side elevation of another embodiment of the structure in accordance with this invention employing double buoyant supports and showing the structure in floating position.
Fig. 18 is a diagrammatic view of the apparatus for controlling the buoyancy of the removable supports employed in conjunction with the embodiment illustrated in Figs. 16 and 17.
Figure 10:
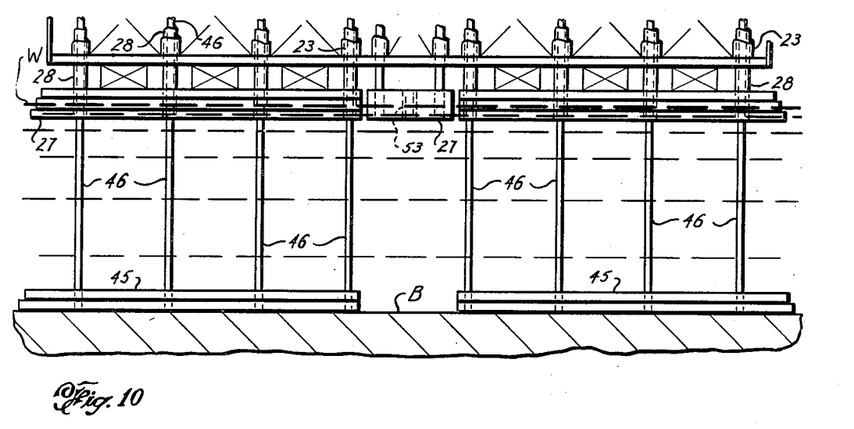
Figs. 10 and 11 are fragmentary views of the embodiment illustrated in Fig. 9 illustrating two stages in the erection of this embodiment.
Figure 11:
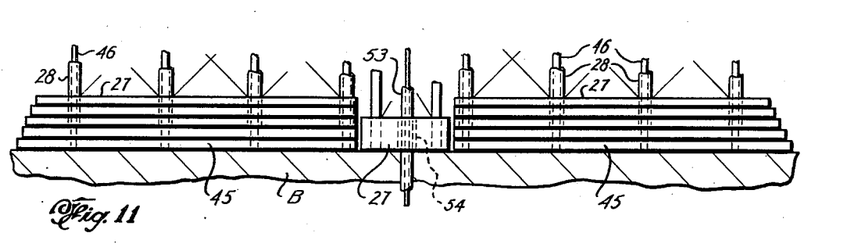

Figs. 9 to 11, inclusive, illustrate another embodiment in which a set of buoyant chambers 45 are disposed beneath chambers 27 and are of corresponding form and shape. Chambers 45 are provided with hollow columns 46 which extend through columns 28 and thence through columns 23. In the floating position illustrated in Fig. 9, chambers 45 are retracted against the bottom surfaces of chambers 27 and are adapted to increase the supporting capacity thereof. In erecting this structure chambers 45 are first lowered to the land bottom in substantially the same manner as previously described for lowering chambers 27, the structure being floatingly supported on chambers 27. (See Fig. 10.) After the load of the structure has been placed on columns 46, chambers 27 will be lowered in the previously described manner with application of cross bracing and brought to rest on the upper surfaces of chambers 45 (Fig. 11). The load of the platform may now be supported on both chambers and their columns. These steps are reversed to refloat the structure.

Figure 12:
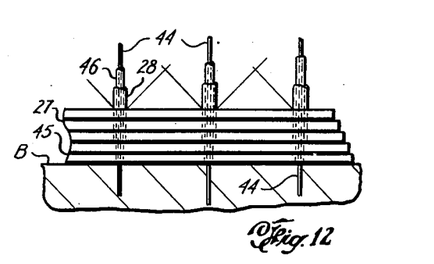
Figs. 12 and 13 are fragmentary views of modifications of the structure of Fig. 9.
Figure 13:
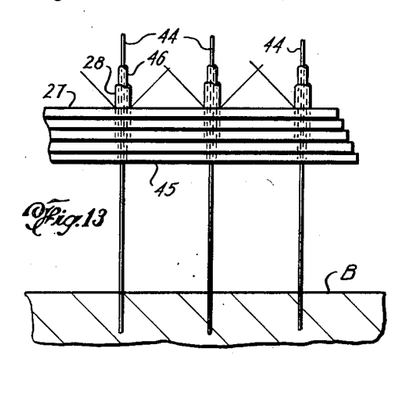

Figs. 12 and 13 show the application of piles 44 to the embodiment of Figs. 9 to 11 in a manner corresponding to the modifications illustrated in Figs. 7 and 8.

Figure 14:
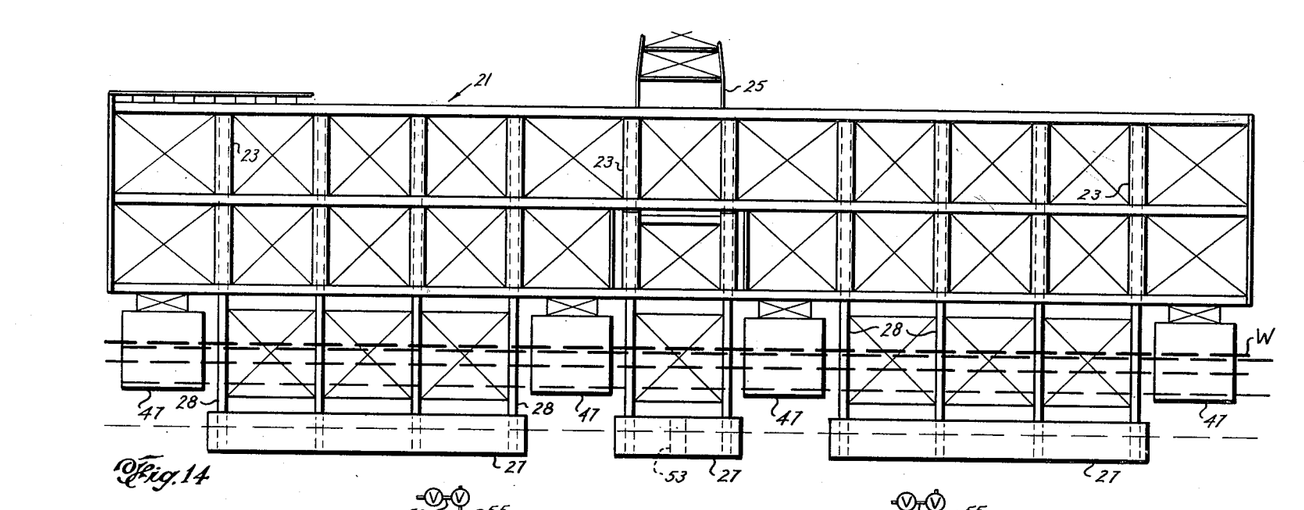
Fig. 14 is a side elevation of still another embodiment in accordance with this invention wherein a combination of extendible and removable buoyant supports is employed, and showing the structure fully afloat.
Figure 15:
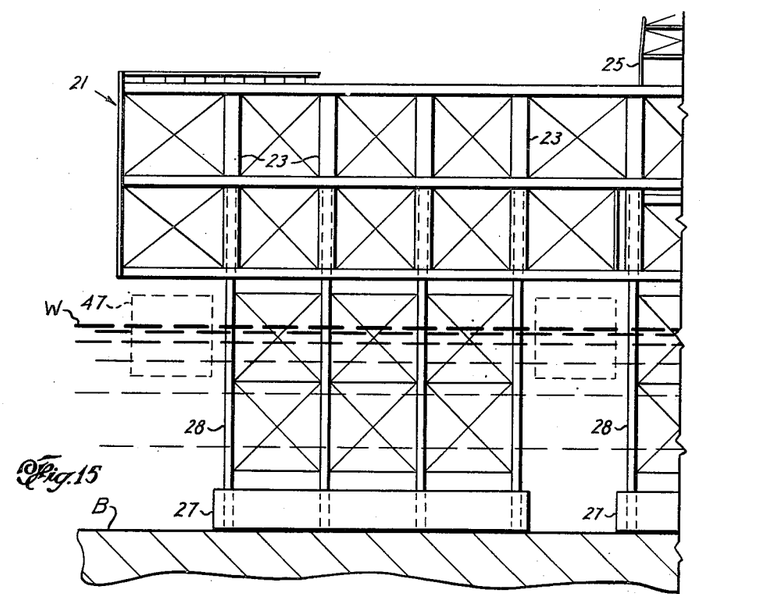
Fig. 15 is a partial side elevation of the structure of Fig. 14 showing the structure in fully erected position.

Figs. 14 and 15 illustrate still another embodiment in accordance with this invention. In this embodiment some of the chambers 27 are replaced by removable buoyant hulls 47 which are suitably interspersed, as illustrated, between the chambers 27. These hulls 47 together with chambers 27 are employed to buoyantly support platform 21 while in transit and during the operation of lowering chambers 27 to the bottom (Fig. 14). When chambers 27 are on bottom and supporting the platform (Fig. 15) the hulls 47 may be removed. When the platform is to be refloated hulls 47 will be reinserted beneath the platform in their previous locations to take the load of the platform while chambers 27 are dewatered and retracted to their original positions for buoyantly supporting the platform. Fig. 18 diagrammatically illustrates apparatus which may be employed for regulating the buoyancy of hulls 47 when necessary in order to effect insertion and removal of the hulls beneath the platform, or to adjust the position of the hull relative to chambers 27. As illustrated, this apparatus includes a valve such as a sea cock 48 arranged inside the hull for admitting water thereto. An operating handle 49 extends from the sea cock to above the deck of the hull. A pump 50 has a suction pipe 51 extending into the hull and a discharge pipe 52. With this arrangement, which is merely illustrative of many conventional arrangements adapted for this purpose, the buoyancy of hulls 47 may be regulated as desired.

Figure 16:
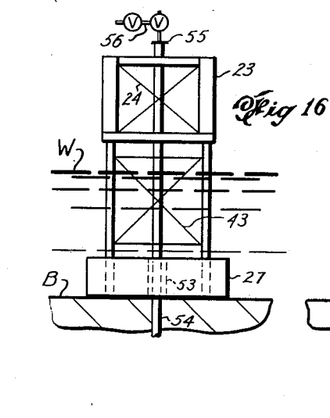
Figs. 16 and 17 are side and end elevations of a portion of the structure of Fig. 1 which is left in place at a location after removal of the major portion of the structure.
Figure 17:
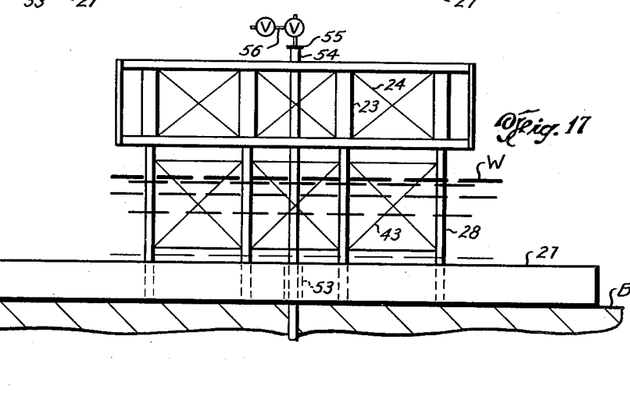

Figs. 16 and 17 illustrate a portion of the erected structure which may be left in place, when removing the remainder of the structure. This will ordinarily be desirable when the platform structure is employed for drilling a well and an oil or gas well has been successfully completed. In such cases a platform structure will ordinarily be required about the well head to protect the well head to provide a working platform for conducting operations in and about the well. This portion of the structure may be a part of each of the several embodiments described above and illustrated in the drawings. In each case, the chamber 27 which is disposed beneath the portion of the platform on which derrick 25 is supported will be provided with an opening 53 in registration with the vertical axis of the derrick. The usual conductor pipe 54 and the other strings of casing (not shown) which are conventionally enclosed within the conductor pipe, may thus be run through opening 53 into bottom B in drilling the well. The upper end of conductor pipe 54 will be equipped with a conventional casing head 55 having the usual "Christmas tree" fittings 56 connected thereto. The well head will ordinarily be disposed at a level between the upper and lower decks of platform 21. When the well has been completed and thus equipped and preparations are made to refloat the platform structure for removal from the drilling site, the portion of the structure immediately surrounding the well head, including the center chamber 27, will be left on bottom and its structural column connecting it to the platform and a registering portion of platform 21 extending to a suitable intermediate level below its upper deck will be cut loose from the remainder of the platform structure, so that when the remaining chambers 27 are retracted and the platform re-floated thereon, the platform may be removed leaving the severed portion in place about the well head, as illustrated particularly in Figs. 16 and 17. This portion of the original platform structure will, of course, be replaced in the platform structure before the latter is re-erected at another location.

It will be understood that various alterations and changes may be made in the details of construction and in the method steps employed in accordance with this invention without departing from the scope of the appended claims but within the spirit of this invention.

What I claim and desire to secure by Letters Patent is:

1. The method of constructing an off-shore working platform, comprising, pre-fabricating a platform structure including a main platform section having a plurality of buoyancy chambers disposed therebeneath for buoyantly supporting the same, said chambers having extensible tubular column members connecting said chambers to said platform section, and a plurality of buoyant support sections removably disposed beneath the platform section in interspersed relation with said buoyancy chambers, bodily transporting said structure to a water location while buoyantly supported on said buoyancy chambers and said buoyant sections, successively submerging said chambers to the underlying land bottom, and progressively transferring the buoyantly supported load of said platform section to direct support from said land bottom by the submerged chambers as they are landed on said land bottom until the entire load of said platform structure is directly supported therefrom by all of said chambers.

2. The method according to claim 1 wherein the steps recited therein are conducted in reverse order to refloat said structure, and thereafter withdrawing said buoyant sections from beneath said platform section.

3. The method of constructing an off-shore working platform, comprising, pre-fabricating a platform structure including a main platform section having a plurality of buoyancy chambers disposed therebeneath for buoyantly supporting the same, said chambers having extensible tubular column members connecting said chambers to said platform section, and a plurality of buoyant support sections removably disposed beneath the platform section in interspersed relation with said buoyancy chambers, bodily transporting said structure to a water location while buoyantly supported on said buoyancy chambers and said buoyant sections, sinking selected ones of said buoyancy chambers to the underlying land bottom while maintaining said platform section buoyantly supported on the remaining ones of said buoyancy chambers and said buoyant sections, transferring the load of said platform section to said selected buoyancy chambers, thereafter sinking said remaining ones of said buoyancy chambers to said land bottom while said platform section remains supported in part at least on said buoyant sections, distributing the load of said platform section over all of said buoyancy chambers, and thereafter withdrawing said buoyant sections from beneath said platform section.

HARVEY A. WILSON.

REFERENCES CITED

The following references are of record in the file of this patent:

UNITED STATES PATENTS

| Number | Name | Date |
| --- | --- | --- |
| 1,718,006 | Reno | June 18, 1929 |
| 1,892,125 | Armstrong | Dec. 27, 1932 |
| 2,248,051 | Armstrong | July 8, 1941 |
| 2,327,118 | McKnight | Aug. 17, 1943 |
| 2,352,370 | Carruthers | June 27, 1944 |
| 2,399,656 | Armstrong | May 7, 1946 |
| 2,430,014 | Hansen | Nov. 4, 1947 |
| 2,482,788 | Moon | Sept. 27, 1949 |